United States Patent [19]
Mangtani et al.

[11] Patent Number: 5,764,466
[45] Date of Patent: Jun. 9, 1998

[54] CIRCUIT FOR SHORT CIRCUIT DETECTION THROUGH RESISTIVE SHUNT IN POWER CIRCUITS USING UNIPOLAR CONTROL VOLTAGE

[75] Inventors: Vijay Mangtani, Playa Del Rey; Ajit Dubhashi, El Segundo, both of Calif.

[73] Assignee: International Rectifier Corporation, El Segundo, Calif.

[21] Appl. No.: 789,023

[22] Filed: Jan. 27, 1997

Related U.S. Application Data

[60] Provisional application No. 60/010,793 Jan. 29, 1996.
[51] Int. Cl.⁶ .................................................. H02H 3/00
[52] U.S. Cl. ............................ 361/78; 361/93; 361/100; 361/115
[58] Field of Search ........................ 361/78, 93, 100, 361/58, 115; 327/109; 323/289; 326/87, 27; 363/25, 80

[56] References Cited

U.S. PATENT DOCUMENTS

| | | | |
|---|---|---|---|
| 4,070,701 | 1/1978 | Hamden, Jr. ............................ | 363/25 |
| 4,275,313 | 6/1981 | Boll et al. .............................. | 326/87 |
| 4,709,161 | 11/1987 | Mizohata .............................. | 327/109 |

*Primary Examiner*—Jeffrey A. Gaffin
*Assistant Examiner*—Stephen Jackson
*Attorney, Agent, or Firm*—Ostrolenk, Faber, Gerb & Soffen, LLP

[57] ABSTRACT

A power circuit includes a high-side transistor, a low-side transistor and a current sensing resistor in series connection as well as a threshold detection circuit for turning off the transistors when the current in the current sensing resistor exceeds a predetermined level. The circuit further includes a driver circuit for providing a bias voltage to the low-side transistor and a voltage storing device, such as a capacitor, coupled from the low-side transistor to the driver circuit to maintain the bias voltage at a sufficient magnitude to momentarily keep the low-side transistor on during a fault condition.

16 Claims, 5 Drawing Sheets

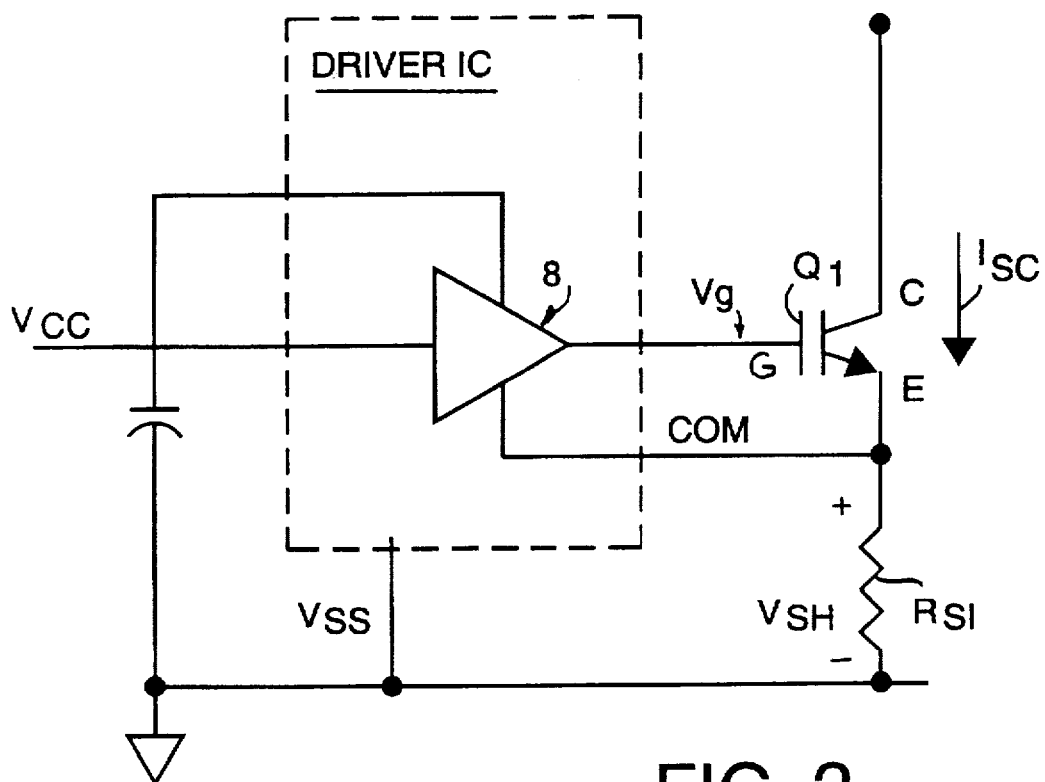
FIG. 2
(PRIOR ART)
FIG. 4
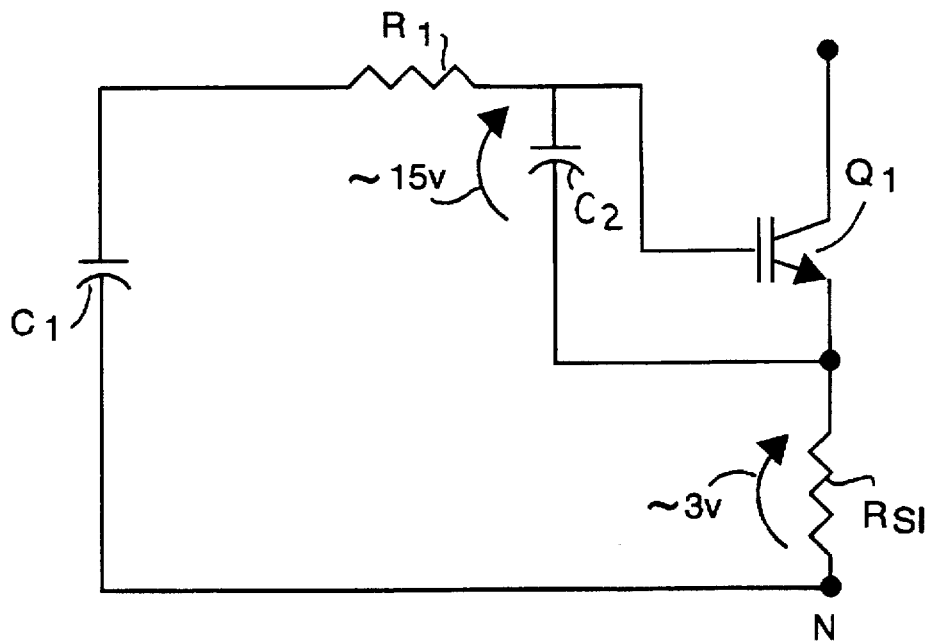

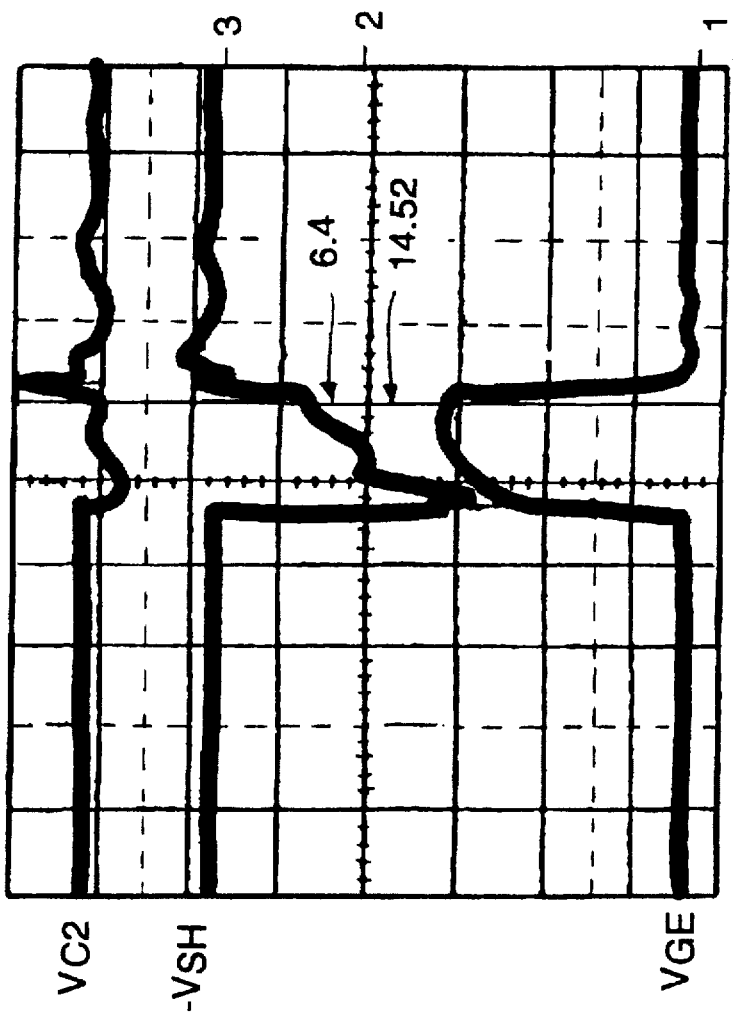

5,764,466

CIRCUIT FOR SHORT CIRCUIT DETECTION THROUGH RESISTIVE SHUNT IN POWER CIRCUITS USING UNIPOLAR CONTROL VOLTAGE

CROSS REFERENCE TO RELATED APPLICATIONS

This application is based on U.S. Provisional Patent Application No. 60/010,793, filed on Jan. 29, 1996, entitled CIRCUIT FOR SHORT CIRCUIT DETECTION THROUGH RESISTIVE SHUNT IN POWER CIRCUITS USING UNIPOLAR CONTROL VOLTAGE.

BACKGROUND OF THE INVENTION

Inverter circuits for converting AC to DC voltage are well known. Inverter circuits typically include a plurality of semiconductor switching elements, such as power MOSFETs or IGBTs and, like most electrical circuits, are subject to failure from short circuits imposed from external sources. These short circuits, which cause a large current to flow through the semiconductor switches, must be detected and the circuit must shut down before the circuit components fail.

To detect a fault current and cause shut down, a comparator with a specific threshold voltage is used. Assuming a fault current exists, if the current rises above a predetermined level, the comparator changes state (digitally) and causes the inverter to shut down. In some circumstances, a short circuit current can be present but the sensed current does not reach the trip level. Therefore, the switching element(s) of the inverter subjected to the short circuit current can fail.

A known circuit for protecting a power inverter circuit with a unipolar supply voltage ($V_{CC}$) is shown in FIG. 1. An inverter comprising a three-phase bridge 2 is illustrated in FIG. 1. Switching elements $Q_1$ through $Q_6$ may be any suitable semiconductor devices, for example, power MOSFETs or IGBTs. The inverter bridge 2 operates between V+ and V−, and includes resistive current shunts, $R_{S1}$, and $RS_2$, arranged in the path of the main current. A fault current through $R_{S1}$ creates a voltage drop across it which might be about 3 volts. This voltage is fed back to a comparator 4 within a driver chip 6. Comparator 4 of driver chip 6 compares the fed back voltage with a predetermined reference value. If the voltage fed back to the comparator is higher than the predetermined reference value, the driver chip 6 turns off the inverter 2.

The problem with the circuit of FIG. 1 is that the inverter will not always shut down when a fault current is present. This is so because at and during the fault, the semiconductor switch $Q_1$ in the short circuit path has a gate voltage imposed on it by a driver 8 which is referenced, not to ground, but to the node of the emitter of $Q_1$ and resistor $R_{S1}$. The equivalent circuit in this case is shown in FIG. 2.

When $Q_1$ is turned on, the gate driver 8 in the driver chip 6 connects the gate of $Q_1$ to the supply voltage $V_{CC}$, where $V_{CC}$ with respect to $V_{SS}$ (ground) is about 15 volts in the usual case. In a short circuit condition, the current through $R_{S1}$ causes a voltage to be developed across it in accordance with the following equation: $V_{SH}=I_{SC} \times R_{S1}$, where $I_{SC}$ is the short circuit current flowing through $Q_1$.

Disadvantageously, the voltage across $R_{S1}$ subtracts from the voltage available to be imposed across the gate and emitter terminals of $Q_1$ (usually 15 volts to maintain the transistor fully on). Thus, the voltage across the gate (G) and emitter (E) terminals of $Q_1$ follows the equation $V_{GE}=V_G-V_{SH}$. Since the current through $Q_1$ is a function of $V_{GE}$, a lower current flows through $Q_1$ than would have if the gate to emitter voltage had been 15 volts. Unfortunately, the lower current in $Q_1$ can be low enough so as not to trigger the shut down of the inverter, even though a short circuit condition exists.

For example, if the comparator is set to turn the inverter 2 off at say $I_{SC}=32$ amps, and the current $I_{SC}$ reaches only 31 amps because of the lower gate voltage on $Q_1$ under the fault condition, the system will not respond to the short circuit and hence $Q_1$ will fail due to overheating.

Accordingly, it would be desirable to provide a circuit for short circuit detection through a resistive shunt in a power circuit using a unipolar control voltage which does not suffer from the disadvantage described above.

SUMMARY OF THE INVENTION

In order to overcome the disadvantages of prior art fault current protection circuits, the preferred embodiment of the present invention provides a DC storage capacitor (or some other auxiliary voltage source) between a reference terminal of a switching element (the emitter, in the case of an IGBT) and the $V_{CC}$ terminal of a gate drive circuit controlling the switching element. The switching element is in a series connection with a current sensing resistor.

The DC storage capacitor receives charge from a DC source through a current limiting resistor. The DC storage capacitor provides a source of DC voltage to a bias terminal of the switching element (the gate, in the case of an IGBT) through the gate drive circuit such that the switching element remains substantially fully biased on despite high currents flowing through the current sensing resistor which result in elevating the voltage at the reference terminal.

Other features and advantages of the present invention will become apparent from the following description of the invention which refers to the accompanying drawings.

BRIEF DESCRIPTION OF THE DRAWING

For the purpose of illustrating the invention, there is shown in the drawing a form which is presently preferred, it being understood, however, that the invention is not limited to the precise arrangement and instrumentality shown.

FIG. 2 is a schematic diagram of a portion of the prior art circuit of FIG. 1 which is operating in a short circuit mode;

FIG. 4 is a schematic diagram of an equivalent circuit of FIG. 3 when $Q_1$ is biased on and a fault current is present; and FIGS. 5A and 5B show timing waveforms of voltage levels of the circuit of FIGS. 3 and 4.

DETAILED DESCRIPTION OF THE PREFERRED EMBODIMENT

The present invention provides a circuit for short circuit detection through a resistive shunt in a power circuit using a unipolar control voltage, which advantageously maintains the gate voltage at $V_{CC}$, e.g. 15 volts, for a short duration during the fault, so that the fault current can reach the designated level to trip the comparator.

Figure 3:
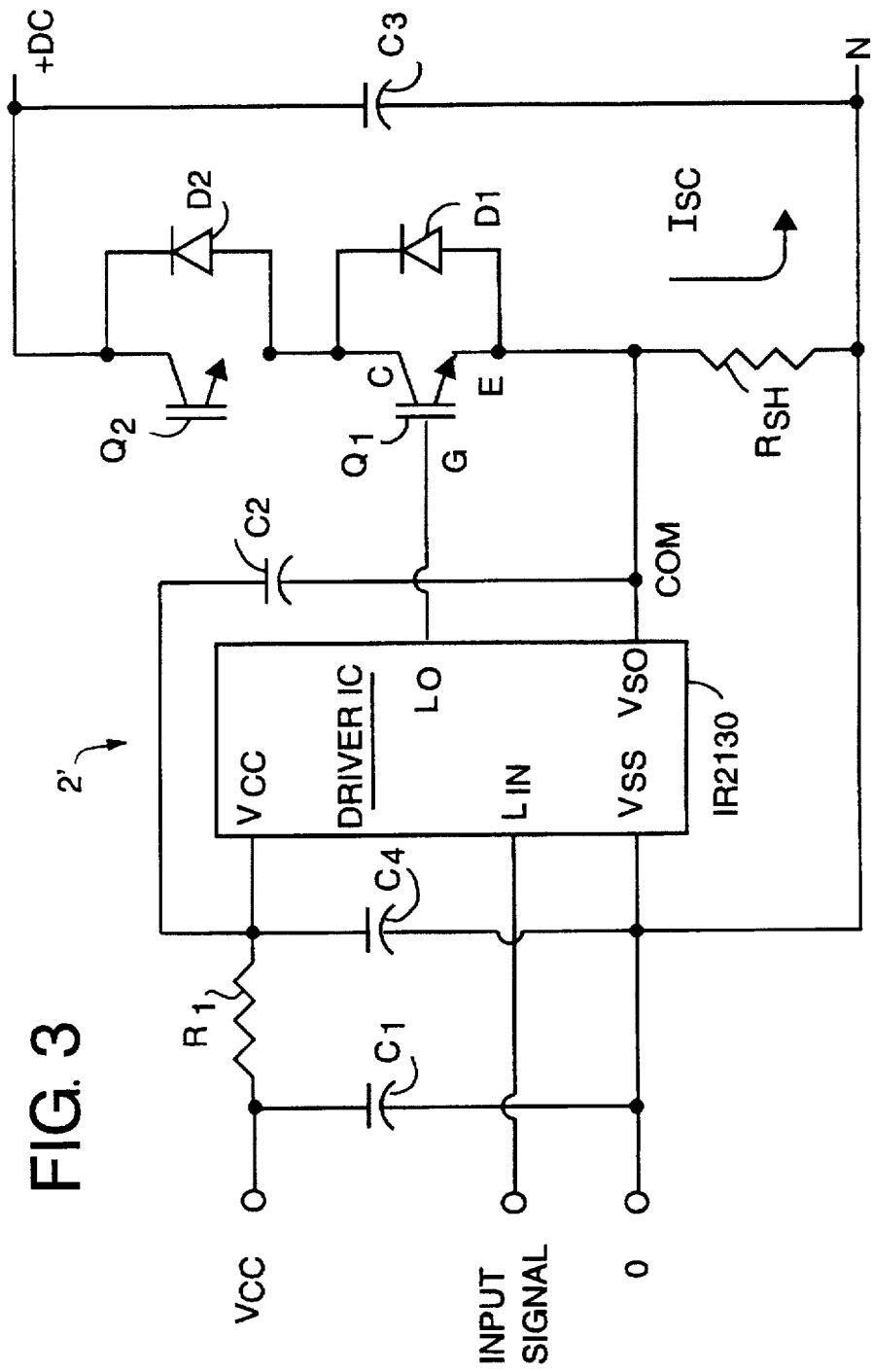
FIG. 3 is a schematic diagram of an inverter circuit (showing only one leg of a three phase bridge) employing a fault current protection circuit in accordance with the preferred embodiment of the present invention.

Referring now to the drawings wherein like numerals indicate like elements, there is shown in FIG. 3 only one leg of a three phase bridge inverter circuit 2' which includes a high-side transistor $Q_2$ and a low-side transistor $Q_1$.

Each transistor is preferably a switching transistor and includes a pair of power terminals (a collector terminal and an emitter terminal in the case of an IGBT) and a bias terminal (a gate terminal in the case of an IGBT). When IGBTs are used as switching transistors, the emitters of the switching transistors are also reference terminals to which the respective turn on and turn off bias voltages applied to the gates are referenced.

Figure 1:
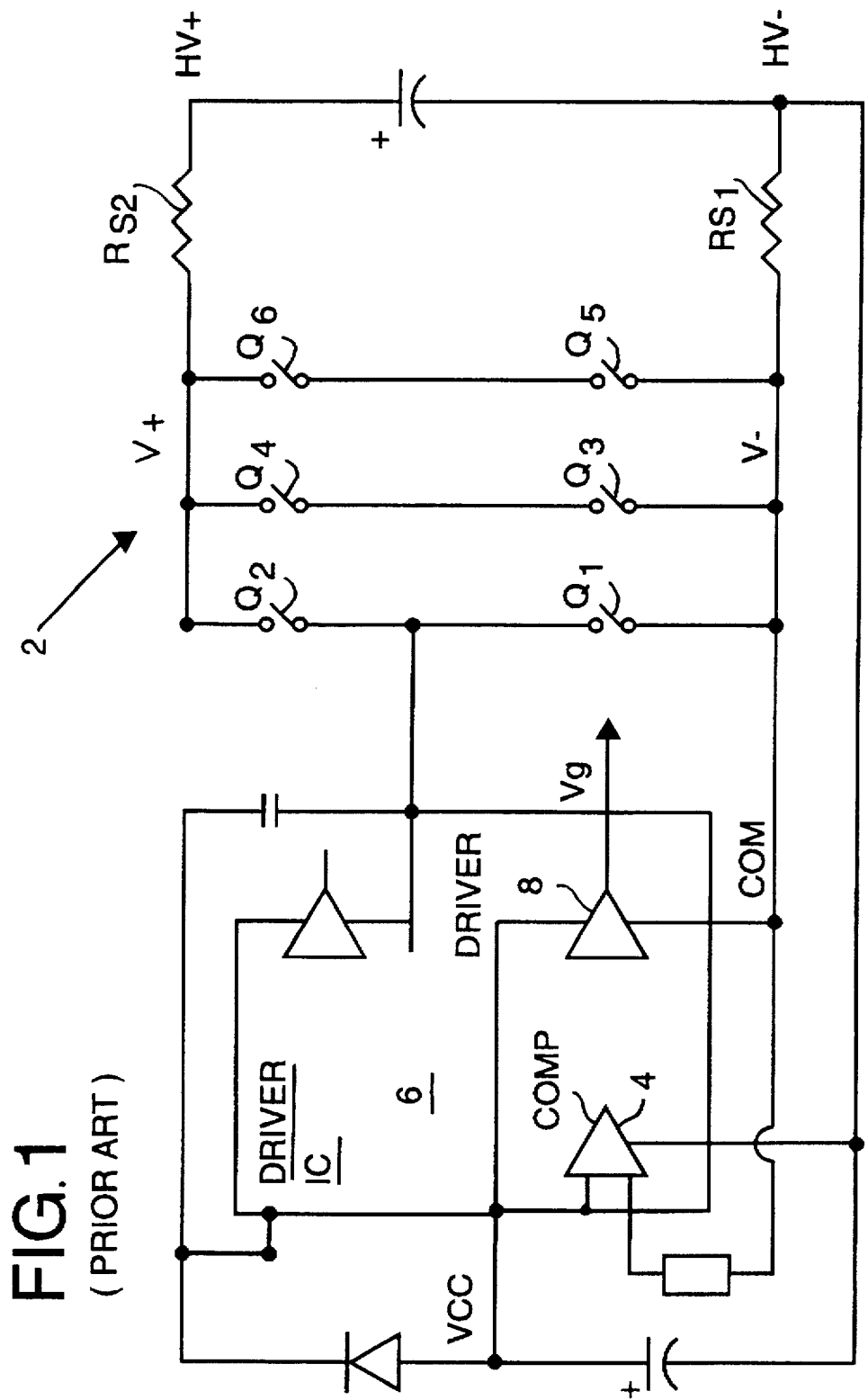
FIG. 1 is a schematic diagram of an inverter circuit employing a prior art short circuit protection arrangement.

A capacitor $C_2$ and a resistor $R_1$ are coupled to the half-bridge circuit and the driver IC 6 as shown. It is preferred that the driver IC is an IR2130 driver which is available to be purchased from the International Rectifier Corporation, the assignee of the present application. Capacitor $C_1$ is a power supply decoupling capacitor, which is also present in the prior art circuit of FIG. 1.

During a short circuit, capacitor $C_2$ provides a buffer power supply, i.e. it keeps the actual gate voltage of $Q_1$ (with respect to the emitter) high enough (for a short period of time) to keep $Q_1$ biased on such that the short circuit current, $I_{SC}$, is maintained at a sufficiently high level to be detected as a fault condition by the comparator of the driver chip 6. Other elements for obtaining sources of auxiliary voltage may be employed in place of capacitor $C_2$.

The circuit of the present invention is applicable to any power circuit configuration in which a resistive sensing element is inserted into the emitter path of a power device. Thus, although driver chip 6 is depicted in FIG. 3 as an IR2130 three phase gate driver IC, it can be any type of gate driver. Similarly, although switching element $Q_1$ is depicted in FIG. 3 as an IGBT, the circuit of the present invention can be used with power converters in which the switching elements are other types of power semiconductor devices, e.g. power MOSFETs (in which case the resistive sensing element is inserted in the source path).

In the operation of the circuit of the present invention, under normal conditions, the voltage across $R_{SH}$ is relatively low and, therefore, $C_2$ charges up to about $V_{CC}$ (i.e., 15 volts). When $Q_1$ is biased on, $C_2$ is coupled to the gate of $Q_1$ through the driver IC 6 and the gate-emitter voltage ($V_{GE}$) of $Q_1$ is about 15 volts.

Reference is now made to FIG. 4 which shows an equivalent circuit of the drive circuitry from FIG. 3 when $Q_1$ is biased on and a short circuit occurs. Initially, $C_2$ retains its 15 volt level and then, due to the elevated voltage (perhaps 3 volts) across $R_{S1}$, starts to discharge back into $C_1$. $R_1$ limits the discharge of $C_2$ into $C_1$ during the short circuit condition an provides an impedance across which voltage may be dropped from $C_2$ to $C_1$ ($R_1$ can also be substituted by a diode). $C_2$, $R_1$ and the ratio of $C_1$ and $C_2$ are selected in such a way that $C_2$ maintains the required gate voltage on $Q_1$ for a period longer than the sensing time of the fault detection circuit (typically a few micro-seconds).

Figure 5A:
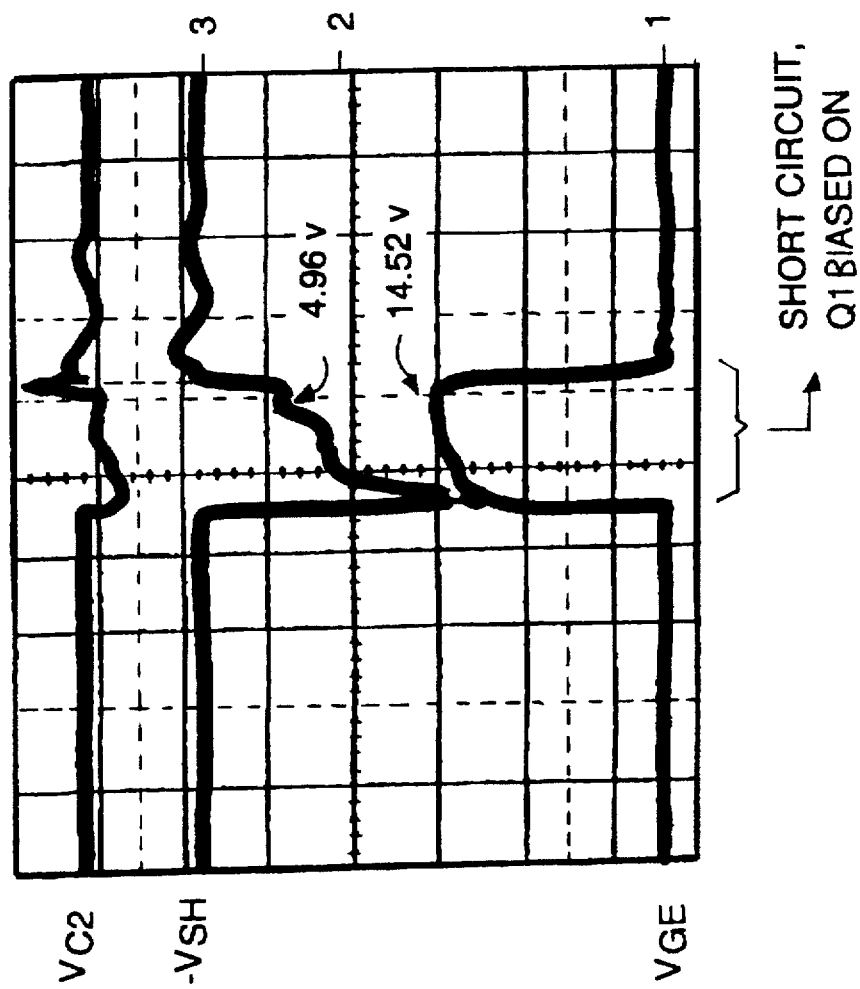

The circuit of the present invention was tested, with the results from a first and second trial shown in the waveforms of FIGS. 5A and 5B, respectively. In trial 1, $C_2$ is 1 μF, $C_1$ is 20 μF, $C_4$ is 0.1 μF and $R_1$ is 11 ohms. In trial 2, $C_2$ is changed to 4.7 μF. Note that $V_{GE}$ is about 14.52 volts during a short circuit in both cases. The voltage across $C_2$ is about 14.92 volts in trial 1 and trial 2. Despite a change in $V_{SH}$ from 4.96 volts in trial 1 to 6.4 volts in the trial 2, $V_{GE}$ maintained a high value which indicates the proper operation of the circuit.

Although the present invention has been described in connection with a preferred embodiment thereof, many variations and modifications will become apparent to those of skill in the art. For example, although the implementation of the circuit of the invention described herein is directed to an inverter, the invention is applicable to any power circuit using a similar type of sensing and protection. The foregoing description of the preferred embodiment of the present invention is not intended to be exhaustive or to limit the invention to the precise form disclosed. It is intended that the scope of the invention be limited not by this detailed description, but rather by the claims appended hereto.

What is claimed is:

1. A power circuit having a fault current protection circuit, the power circuit comprising:

a high-side transistor coupled in series with a low-side transistor, the low-side transistor having a pair of power terminals and a bias terminal, one power terminal also serving as a reference terminal;

a current sensing resistor connected from the reference terminal of the low-side transistor to a ground terminal of the circuit;

a driver circuit having a $V_{CC}$ terminal and a $V_{SS}$ terminal across which a source of unipolar DC voltage is coupled, the driver circuit being adapted to deliver a bias voltage, of substantially the same magnitude as the unipolar DC voltage, across the bias and reference terminals of the low-side transistor to bias the low-side transistor on; and a voltage storing device coupled from the reference terminal of the low-side transistor to the $V_{CC}$ terminal of the driver circuit such that the voltage across the $V_{CC}$ and $V_{SS}$ terminals is increased in accordance with an increase in voltage across the current sensing resistor and such that the bias voltage is sufficiently high to maintain the low-side transistor substantially fully on.

2. The power circuit of claim 1, wherein the voltage storing device is a capacitor.

3. The power circuit of claim 1, wherein the high-side and low-side transistors are insulated gate bipolar transistors.

4. The power circuit of claim 1, wherein the high-side and low-side transistors are MOSFET transistors.

5. The power circuit of claim 1, wherein the circuit further comprises:

a second high-side transistor and a second low-side transistor connected in series relationship; and a third high-side transistor and a third low-side transistor connected in series relationship;

the transistors being arranged in a three phase bridge configuration across a high voltage source.

6. The power circuit of claim 1, further comprising a threshold detection circuit for turning off the high-side and low-side transistors in response to a fault condition where excessive current flows through and an excessive voltage is developed across the current sensing resistor.

7. The power circuit of claim 6, wherein the threshold detection circuit comprises a voltage comparator for sensing the voltage across the current sensing resistor.

8. The power circuit of claim 6, wherein:

the voltage storing device is a first capacitor;

the current limiting device is a resistor; and the circuit further comprises a second capacitor in parallel connection with the source of unipolar DC voltage, the first and second capacitor and limiting resistor being sized such that the bias voltage is maintained sufficiently high for a period longer than the time required by the threshold detection circuit to sense the fault condition.

9. The power circuit of claim 1, further comprising a current limiting element connected between the source of unipolar DC voltage and the $V_{CC}$ terminal of the driver circuit such that the voltage storing device may receive charge from the source of unipolar voltage.

10. The power circuit of claim 4, wherein the current limiting element is a resistor which provides an impedance across which a voltage may be developed so that the voltage storing device may increase the voltage across the $V_{CC}$ and $V_{SS}$ terminals.

11. The power circuit of claim 4, wherein the current limiting element is a diode which provides an impedance across which a voltage may be developed so that the voltage storing device may increase the voltage across the $V_{CC}$ and $V_{SS}$ terminals.

12. A power circuit having a fault current protection circuit, the power circuit comprising:
- a high-side transistor coupled in series with a low-side transistor, the low-side transistor having a pair of power terminals and a bias terminal, one power terminal also serving as a reference terminal;
- a current sensing resistor connected from the reference terminal of the low-side transistor to a ground terminal of the circuit;
- a driver circuit having a $V_{CC}$ terminal and a $V_{SS}$ terminal across which a source of unipolar DC voltage is coupled, the driver circuit being adapted to deliver a bias voltage, of substantially the same magnitude as the unipolar DC voltage, across the bias and reference terminals of the low-side transistor to bias the low-side transistor on; and
- an auxiliary voltage source coupled from the reference terminal of the low-side transistor to the $V_{CC}$ terminal of the driver circuit for increasing the voltage across the $V_{CC}$ and $V_{SS}$ terminals in accordance with an increase in voltage across the current sensing resistor and such that the bias voltage is sufficiently high to maintain the low-side transistor substantially fully on.

13. The power circuit of claim 12, wherein the high-side and low-side transistors are insulated gate bipolar transistors.

14. The power circuit of claim 12, wherein the high-side and low-side transistors are MOSFET transistors.

15. The power circuit of claim 12, further comprising a threshold detection circuit for turning off the high-side and low-side transistors in response to a fault condition where excessive current flows through and an excessive voltage is developed across the current sensing resistor.

16. The power circuit of claim 15, wherein the threshold detection circuit comprises a voltage comparator for sensing the voltage across the current sensing resistor.

* * * * *